United States Patent
Thorson et al.

(10) Patent No.: US 7,626,998 B2
(45) Date of Patent: Dec. 1, 2009

(54) COMMUNICATION DEVICE, COMMUNICATION NODE, AND METHOD FOR TRANSMITTING A MESSAGE

(75) Inventors: Dean E. Thorson, Grayslake, IL (US); Daniel J. Declerck, Lake Barrington, IL (US); Jonathan H. Gross, Gilbert, AZ (US); Shawn W. Hogberg, Chandler, AZ (US)

(73) Assignee: Motorola, Inc., Schaumburg, IL (US)

( * ) Notice: Subject to any disclaimer, the term of this patent is extended or adjusted under 35 U.S.C. 154(b) by 601 days.

(21) Appl. No.: 11/304,020

(22) Filed: Dec. 15, 2005

(65) Prior Publication Data
US 2007/0140204 A1   Jun. 21, 2007

(51) Int. Cl.
*H04L 12/42* (2006.01)
(52) U.S. Cl. ...................................... 370/452
(58) Field of Classification Search ................. 370/342, 370/332, 320, 318, 335, 338, 470, 392, 395.4, 370/390, 401, 447, 389, 317, 334, 337, 452; 455/69, 127.5, 522, 423, 436
See application file for complete search history.

(56) References Cited

U.S. PATENT DOCUMENTS 5,686,901 A * 11/1997 Chen .......................... 340/7.43
5,710,981 A * 1/1998 Kim et al. ...................... 455/69
7,286,499 B2 * 10/2007 Tiedemann, Jr. ............ 370/318
2001/0033611 A1 10/2001 Grimwood et al.
2002/0167907 A1 11/2002 Sarkar et al.
2005/0124372 A1 6/2005 Lundby et al.

OTHER PUBLICATIONS

David W. Paranchych; "On The Performance Of Fast Forward Link Power Control In IS-2000 CDMA Networks"; 2000 IEEE; paranchy@nortelnetworks.com.
Lei Song, Jack M. Holtzman; "CDMA Dynamic Downlink Power Control"; 1998 IEEE; lsong@winlab.rutgers.edu.
Jessica Yeh, Arif Khan, Levent Aydin, Walid Hamdy; "Performance Comparison of CDMA2000 Forward Power Control Modes"; 2003 IEEE; jyeh@qualcomm.com.

* cited by examiner

*Primary Examiner*—Chi H Pham
*Assistant Examiner*—Alexander Boakye
(74) *Attorney, Agent, or Firm*—Sylvia Chen

(57) ABSTRACT

A communication device (102), communication node (104), and method for transmitting a message are disclosed. The method includes calculating number of frames (402) in a message to be transmitted from the communication device. The method further includes determining transmission power (404) for the message based on the number of frames. The method further includes transmitting each frame of the message (406) using the determined transmission power.

21 Claims, 4 Drawing Sheets

| NUMBER OF FRAMES | FIRST LIST OF TRANSMISSION POWER GAIN (dB) | SECOND LIST OF TRANSMISSION POWER GAIN (dB) |
|---|---|---|
| 1 | 3.0 | 4.00 |
| 2 | 6.0 | 7.00 |
| 3 | 8.0 | 9.50 |
| 4 | 9.0 | 10.50 |
| 5 | 10.0 | 12.00 |
| 6 | 11.0 | 13.00 |
| 7 | 11.5 | 14.00 |
| 8 | 12.0 | 14.50 |

FIG. 5

| NUMBER OF FRAMES | FIRST LIST OF TRANSMISSION POWER (WATT) | SECOND LIST OF TRANSMISSION POWER (WATT) |
|---|---|---|
| 1 | 0.40 | 0.46 |
| 2 | 0.80 | 1.05 |
| 3 | 1.26 | 1.82 |
| 4 | 1.59 | 2.40 |
| 5 | 2.00 | 3.17 |
| 6 | 2.52 | 4.18 |
| 7 | 2.83 | 4.80 |
| 8 | 3.17 | 5.51 |

FIG. 6

COMMUNICATION DEVICE, COMMUNICATION NODE, AND METHOD FOR TRANSMITTING A MESSAGE

FIELD OF THE DISCLOSURE

This invention relates in general to communication networks, and more specifically, to transmitting a message in a power-controlled communication network.

BACKGROUND OF THE DISCLOSURE

A communication network includes a plurality of electronic devices and enables the electronic devices to communicate among themselves by transmitting messages that include one or more frames. An example of such a communication network is a Code Division Multiple Access (CDMA) network. This communication is governed by standards such as IS-95, CDMA 2000, and the like. The standards strictly govern the power at which individual frames in a message are transmitted by an electronic device. As the transmission power of each frame in a message increases, a probability of successful delivery of the message at a destination also increases. If there is a constant Frame Error Rate (FER), however, the probability of successful delivery of the message decreases with increase in length (or number of frames) of the message. Assuming a constant target FER, a message with many frames, such as a signaling message, has a lower probability of successfully reaching its destination than a message with only one or two frames.

A consistently low probability of delivering a message (or a certain type of message) can result in a large percentage of messages (or a certain type of messages) not being delivered at their respective destinations. If a message containing channel information, sent from a Base Transceiver Station (BTS) to a mobile phone, is not successfully delivered, then the mobile phone may not be able to connect to a communication network. This might, at least temporarily, prevent a user of the mobile phone from making a call. Unsuccessful message delivery can also cause poor quality of communication if a large percentage of messages are lost during an active communication session. Further, in the worst case, failure to successfully receive one or more messages may lead to termination of an active communication session.

In an existing method for increasing the probability of delivery of a message, the transmission power for each message is increased by a fixed amount. However, the method has the following limitations. Firstly, the method results in excessive power consumption. Even when the message could be successfully transmitted at a lower transmission power, it is transmitted at a higher transmission power. Secondly, in the case where an electronic device is a mobile phone or other battery-powered device, the method results in shorter battery life. A user of the mobile phone will have to recharge or change the battery frequently. Thirdly, the method fails to provide a consistent quality of service because of varying probabilities of successful delivery for messages of different lengths (or different types of messages).

BRIEF DESCRIPTION OF THE FIGURES

The present invention is illustrated by way of example and not limitation in the accompanying figures, in which like references indicate similar elements, and in which:

FIG. 5 shows a look-up table illustrating the variation of transmission power gain with number of frames in a message, in accordance with an embodiment.

FIG. 6 shows an alternate look-up table illustrating the variation of transmission power with number of frames in a message, in accordance with an embodiment.

Figure 1:
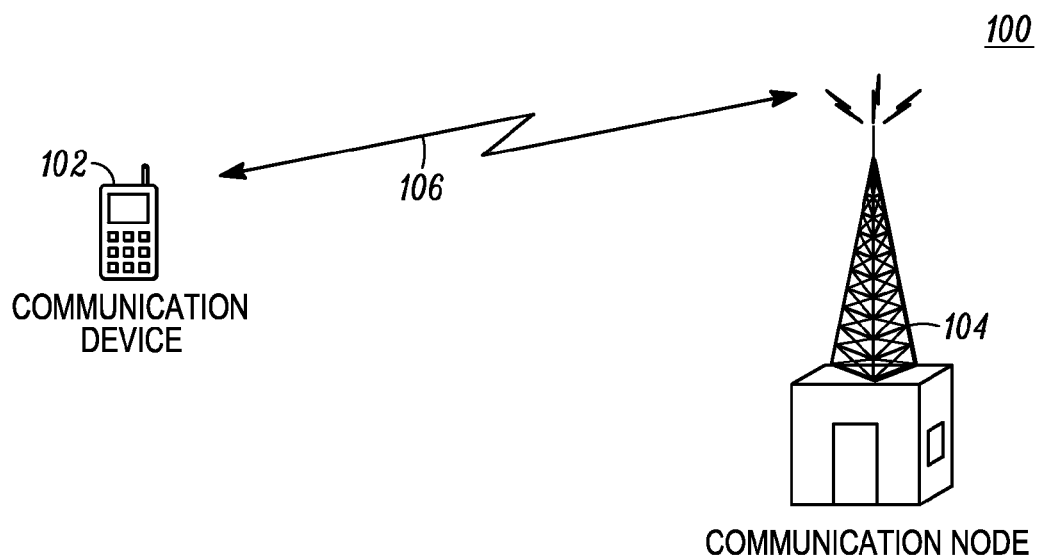
FIG. 1 represents an environment, where various embodiments may be practiced.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the present invention resides primarily in combinations of method steps and apparatus components related to the communication device, communication node, and method for transmitting a message. Accordingly, the apparatus components and method steps have been represented where appropriate by conventional symbols in the drawings, showing only those specific details that are pertinent to understanding the present invention, so as not to obscure the disclosure with details that will be readily apparent to those of ordinary skill in the art, having the benefit of the description herein.

In this document, relational terms such as first and second, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Various embodiments of the invention provide a method for transmitting a message. The method includes calculating the number of frames in a message. The transmission power is determined based on the number of frames in the message. Further, each frame of the message is transmitted using the determined transmission power.

Various embodiments of the invention also provide a communication device. The communication device includes a processor, and a transmitter. The processor calculates the number of frames in a message from the communication device based on the length of the message. Thereafter, the processor determines the transmission power based on the number of frames. Then, the transmitter transmits each frame of the message at the determined transmission power.

Various embodiments of the invention provide a communication node. The communication node includes a processor, an amplifier, and a transmitter. The processor calculates the number of frames in a message from the communication node. An amplifier adjusts transmission power of the communication node while transmitting the message.

FIG. 1 represents an environment, where various embodiments of the present invention may be practiced. The environment represents a part of a communication network. Examples of a communication network include a Code Division Multiple Access (CDMA) network, and a Universal Mobile Telecommunications Service (UMTS) network. The environment includes a first communication entity 102 which is a communication device, a second communication entity 104 implemented as a communication node, and a wireless link 106. The communication entities 102 and 104 communicate among themselves through the wireless link 106. The wireless link 106 provides a path over which data associated with the communication is transmitted between the communication entities 102 and 104.

The communication entity 102 implemented as a communication device can be, for example, a mobile phone, a laptop computer with a wireless card, a messaging device, and the like. Examples of a communication entity 104 implemented as a communication node include a BTS, a Base Station Controller (BSC), and the like. The communication entities 102 and 104 use messages of at least one frame in length to communicate among themselves. Examples of messages include, but are not limited to, signaling messages, status request messages, status response messages, service negotiation messages, and redirect messages. These messages can include system information, channel availability, channel assignments, general paging, access parameters, and the like. The messages are transmitted in frames at a pre-defined value of transmission power.

Figure 2:
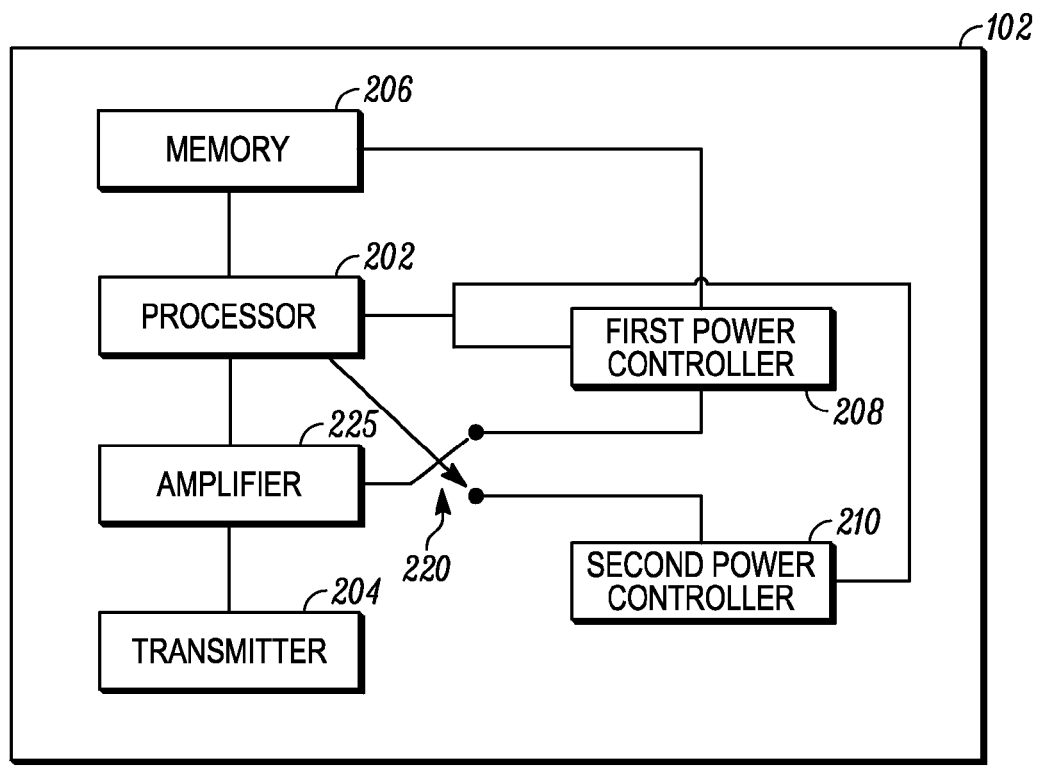
FIG. 2 is a block diagram of a communication entity, in accordance with a first embodiment.

FIG. 2 is a block diagram of a communication entity 102, in accordance with a first embodiment. The communication entity 102 can be a portable or stationary communication device, such as a mobile station or user equipment, or a portable or stationary communication node, such as a base station controller. A communication node is responsible for enabling the communication between the communication devices in a communication network. At any time, a communication node can send messages to a large number of communication devices. The communication entity 102 includes a processor 202, at least one power controller 208, an amplifier 225, and a transmitter 204. The processor 202 calculates the number of frames required to transmit a message from the communication entity 102. The number of frames is calculated based on, among other things, the length of the message. A first power controller 208 determines a transmission power at which to transmit each frame of the message based on the number of frames calculated by the processor 202. The first power controller 208 is operatively coupled to the amplifier 225, and the transmitter 204 is operatively coupled to the amplifier 225. In various embodiments, the transmission power is determined by the first power controller 208 using information stored in a memory 206, and the transmission power is determined based on the values of transmission power gain (or transmission power) in a look-up table described in conjunction with FIG. 5 and FIG. 6 or from a link-simulation curve described in conjunction with FIG. 7.

In another embodiment, the transmission power is selected so as to achieve a pre-define probability of successfully delivering the message. The pre-defined probability signifies a probability of successfully delivering a message of a given length at a given value of the transmission power. Each frame transmitted with that transmission power will contribute to the pre-defined probability of delivery of the entire message. This probability can be determined with the help of experimentation, through simulation, or using actual experience. As the length of the message increases, the number of frames required to transmit the message also generally increases. This results in a reduced effective probability of delivery of the message unless the transmission power of the frames in the message is altered.

In an embodiment, the communication entity 102 also includes a second power controller 210. The first power controller 208 determines the transmission power of the communication entity 102 to transmit the message based on information from the processor 202 and the memory 206. In an embodiment, the first power controller 208 determines the transmission power based on number of frames in a message and a value stored in the memory 206. The second power controller 210 determines the transmission power based on an existing power control scheme. It should be appreciated that one power controller can perform the task of both the power controllers 208 and 210. This combination power controller would have logic to determine whether the existing power control scheme is used, or the transmission power is adjusted based on the length of the message.

A power control scheme defines transmission power of the communication entities 102 and 104 for transmitting a message. Examples of existing power control schemes associated with a communication network include, but are not limited to, the CDMA-2000 power control scheme and the IS-95 power control scheme. In IS-95, a fast closed loop power control is applied at a reverse link. A reverse link is a path from a communication device to a communication node. In CDMA-2000, there is an open loop power control mechanism in addition to the fast closed loop power control for the reverse link.

In accordance with an embodiment, a switch 220 disables the second power controller 210 when the first power controller 208 is operational, so that a message can be transmitted at the transmission power determined based on number of frames in the message rather than the existing power control scheme. The switch 220 is controlled by the processor 202. The second power controller 210 can be re-enabled after the transmission of the message using the first power controller 208. The first power controller 208 can be selectively operative for only certain message types, message lengths, or other factors, to allow for standard power control in certain situations and message-based power control in other situations.

Figure 3:
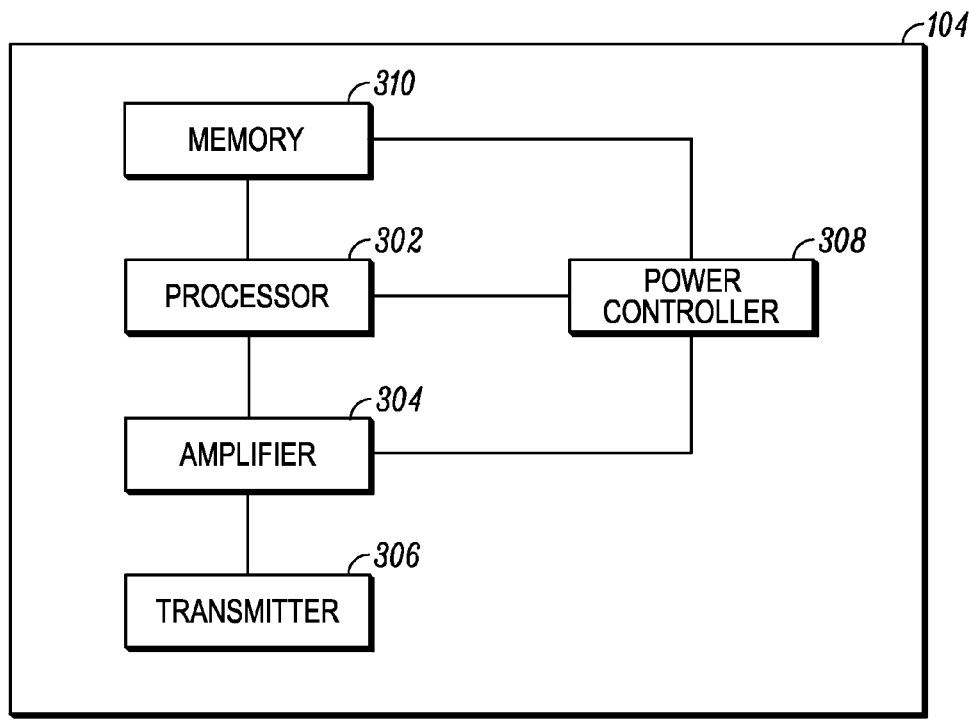
FIG. 3 is a block diagram of a communication entity, in accordance with a second embodiment.

FIG. 3 is a block diagram of a communication entity 104, in accordance with a second embodiment. The communication entity 104 includes a processor 302, an amplifier 304, a combination power controller 308, and a transmitter 306. The processor 302 calculates number of frames required to transmit a message from the communication entity 104. The number of frames is calculated based on, among other things, the length of the message. The power controller 308 determines transmission power for transmitting the message based on the number of frames in the message. An amplifier 304 is operatively coupled to the processor 302 and the power controller 308. The amplifier 304 adjusts transmission power of the communication entity 104 based on the transmission power determined by the power controller 308. Further, the transmitter 306 is operatively coupled to the amplifier 304. The transmitter 306 transmits each frame of the message from the communication entity 104 at the transmission power provided by the amplifier 304.

In an embodiment, the transmission power of the communication entity 104 is selected from a look-up table stored in a memory 310. The look-up table is further explained in conjunction with FIG. 5 and FIG. 6. In another embodiment, the transmission power of the communication entity 104 is selected from a link-simulation curve stored in the memory 310. The link-simulation curve is further explained in conjunction with FIG. 7.

In an embodiment, the communication entity 104 includes a combination power controller 308, which was discussed earlier. The combination power controller can 308 adjust the transmission power of the communication entity 104 either based on an existing power control scheme or based on a message-length-based power control scheme. This combination power controller 308 can be selectively modified so that the standard power control is used in most situations while message-based power control can be used for, among other factors, certain types of messages.

Figure 4:
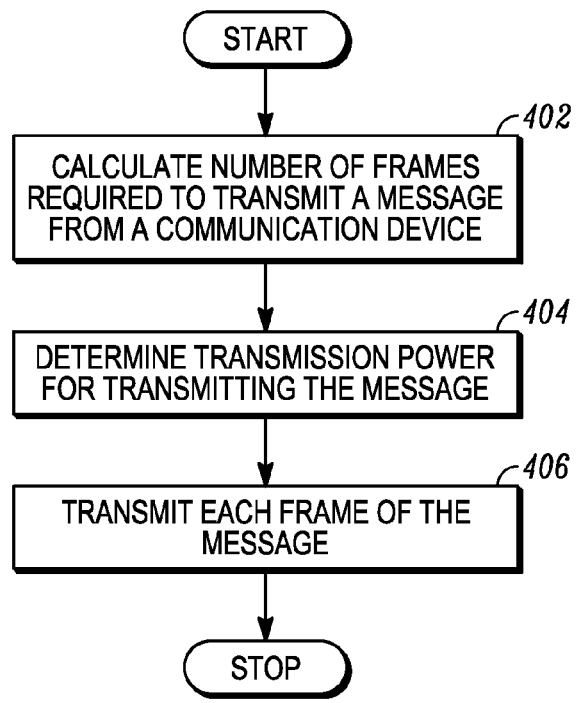
FIG. 4 is a flowchart illustrating a method for transmitting a message, in accordance with an embodiment.

FIG. 4 is a flowchart illustrating a method for transmitting a message that can be used by either communication entity 102 or 104, in accordance with an embodiment. At step 402, the number of frames required to transmit the message is calculated. The number of frames is calculated based on, among other factors, the length of the message. The processor 202 or the processor 302 calculates the number of frames in a message. At step 404, transmission power of the communication entity 102 or 104 for transmitting the message is determined. The transmission power is determined based on the number of frames in the message. The processor 202 or the processor 302 determines the transmission power at which to transmit the message based on the number of frames. At step 406, each frame of the message is transmitted using the determined transmission power. The transmitter 204 transmits each frame of the message using the determined transmission power in order to achieve a pre-defined probability of successfully delivering the message.

For example, transmission power can be determined such that to ensure that the probability of successfully delivering a message is 98%. It should be appreciated that this probability of success may result in a different target FERs for different messages. In another example, when a message has eight frames, and each frame has 1% FER based on a standard power control scheme, then a message error rate would be 8%. For some messages, an 8% error rate is unacceptable. The transmission power can be determined such that the message error rate becomes 2%. This means that the transmission power would need to be altered so that the FER would be 0.25% for each of the eight frames in the message.

In an embodiment, a value of the transmission power is selected from a look-up table. The look-up table is further explained in detail in conjunction with FIG. 5 and FIG. 6. In an alternate embodiment, the transmission power of the transmitter 204 or the transmitter 306 is modified based on a link-simulation curve explained in detail in conjunction with FIG. 7. Subsequent instances of the message can be re-transmitted at a higher power level when the first instance of the message is either lost or damaged during the transmission.

FIG. 5 shows a look-up table 500 illustrating the variation of the transmission power gain with number of frames in a message, in accordance with an embodiment. The look-up table 500 includes a mapping from the number of frames in the message 502 to a first list of values for the transmission power gain 504. In an embodiment, the look-up table 500 also includes a mapping from the number of frames in the message 502 to a second list of values for the transmission power gain 506. Note that the values for the transmission power gain in the second list 506 are greater than corresponding values for the transmission power gain in the first list 504.

The value of the transmission power is determined based on the first list of values of the transmission power gain 504 when a first instance of a message is transmitted. For example, for a message that is to be transmitted with two frames, then the value of the transmission power gain, over and above the existing transmission power, is 6.0 dB as determined from the first list of transmission power gain 504. If the number of frames in the message is three, the value of the transmission power gain is 8.0 dB. If a first instance of the message is not received successfully, the value of the transmission power during the re-transmission is determined based on the second list of values of the transmission power gain 506 in the look-up table. As shown in the look-up table 500, with an increase in the number of frames, the values of the transmission power gain in the first list 504, and the second list 506 also increase. This increases the probability of successful delivery of the message.

In an alternate embodiment, shown in FIG. 6, a look-up table 600 includes a first list of values of transmission power 620 (instead of values of transmission power gain) and a second list of values of transmission power 630 corresponding to number of frames in a message 610. The values of transmission power are expressed in Watt. For example, when a first instance of a message with five frames transmitted at 2.00 Watt as per the first list 520 is not delivered at its destination, a second value of transmission power is selected from a look-up table 600 column 630, and the message with five frames is re-transmitted at 3.17 Watt.

Figure 7:
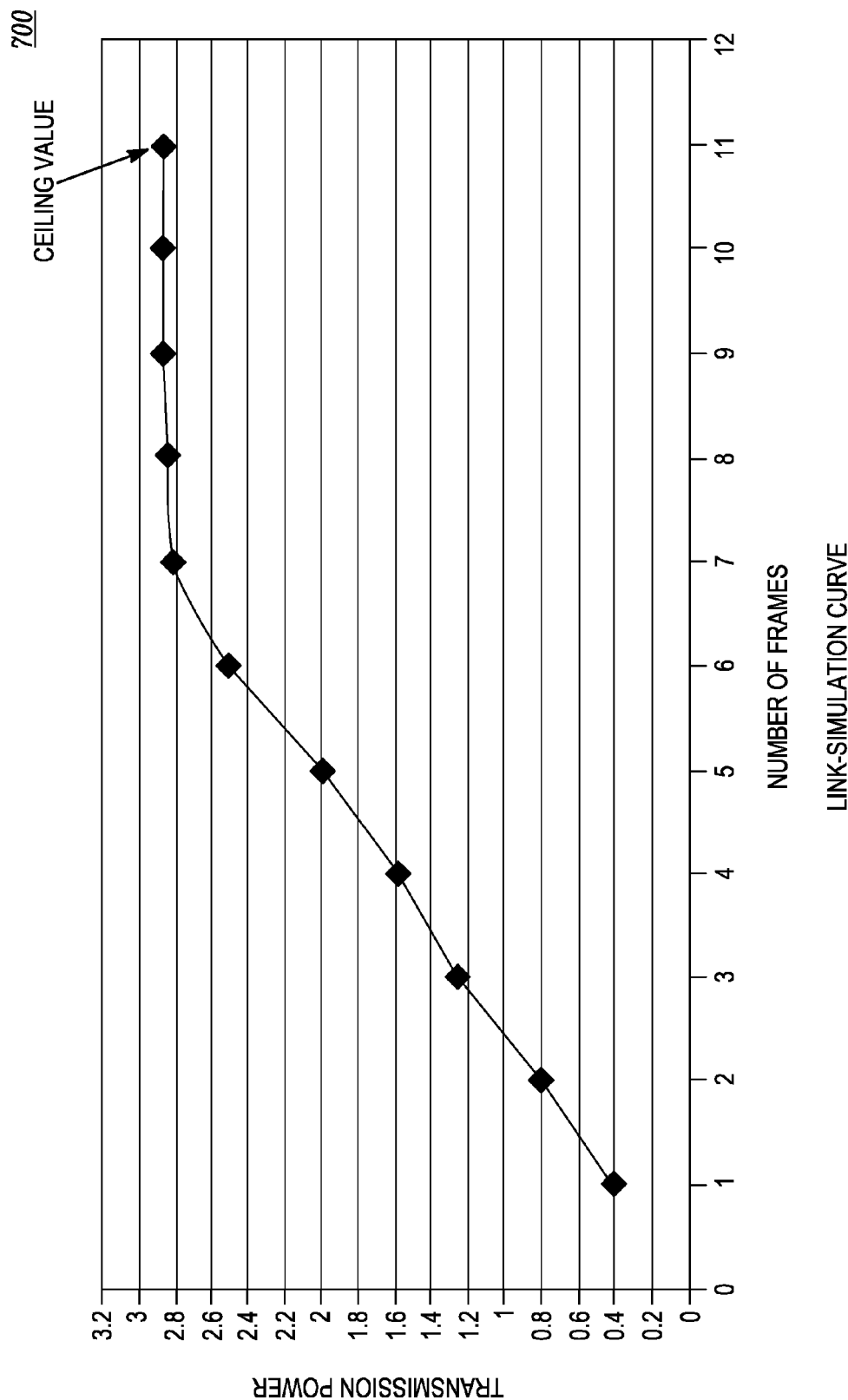
FIG. 7 shows a link-simulation curve representing the variation of transmission power with number of frames in a message, in accordance with an embodiment.

FIG. 7 shows a link-simulation curve 700 illustrating the variation of transmission power with number of frames in a message, in accordance with an embodiment. In the link-simulation curve 700, the X-axis represents the number of frames in the message and the Y-axis represents the transmission power used to transmit each frame of the message. In an alternate embodiment, the Y-axis can represent a transmission power gain instead of the transmission power. The transmission power varies with the variation in the number of frames in the message. The value of the transmission power increases until it reaches a ceiling value.

As implemented by the look-up tables 500 and 600 and the link-simulation curve 700, the transmission power of each frame in a message is increased to ensure a pre-defined probability of delivery of a complete message. The transmitter 204 or 306 increases the transmission power to ensure the pre-defined probability of delivery of the message. The pre-defined probability is based on various factors such as capacity of a communication network to handle the messages, number of messages being sent across in the communication at a specific time, a desire for an increased probability of delivery of a critical message as compared to other traffic in a communication network, and the like.

In yet another embodiment, the transmission power of the communication entity 102 or 104 is restricted by a ceiling value. The ceiling value specifies the maximum value of the transmission power. For a communication device, a ceiling value promotes a power consumption of the communication device that is not unreasonably high. For a communication node, a ceiling value allows communication between a communication device and multiple communication nodes. A ceiling value for a communication device depends on factors such as battery life of the communication device and the physical characteristics of the transmitter 204 or 306. A ceiling value for a communication node also depends on factors such as the physical characteristics of the transmitter 204 or 306.

Various embodiments of the present invention offer the following advantages. The communication device, communication node, and method enable a pre-defined probability of delivery of a particular message, while allowing existing power control of other messages and other bearer frames.

It will be appreciated that the modules described herein may be comprised of one or more conventional processors, and unique stored program instructions that control the one or more processors to implement, in conjunction with certain non-processor circuits, some, most, or all of the functions of the modules described herein. The non-processor circuits may include, but are not limited to, a radio receiver, a radio transmitter, signal drivers, clock circuits, power source circuits, and user input devices. As such, these functions may be interpreted as steps of a method for sharing broadcast service information in a communication network. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein.

It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

In the foregoing specification, the invention and its benefits and advantages have been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A method for transmitting a message by a communication entity, the method comprising:
    calculating by a processor a number of frames in the message to be transmitted, wherein the number of frames is calculated based in part on a length of the message;
    determining a transmission power for the message by a power controller based on the number of frames; and
    transmitting by a transmitter and amplifier each frame of the message using the transmission power.

2. The method according to claim 1, wherein determining the transmission power comprises selecting a value of transmission power gain from a look-up table.

3. The method according to claim 2, wherein determining the transmission power comprises selecting a first value of transmission power gain from the look-up table when a first instance of the message is transmitted.

4. The method according to claim 3, wherein determining the transmission power comprises selecting a second value of transmission power gain from the look-up table when a subsequent instance of the message is transmitted.

5. The method according to claim 1, wherein determining the transmission power comprises selecting the transmission power based on a link-simulation curve mapping transmission power to the number of frames in the message.

6. The method according to claim 1 further comprising disabling another power control scheme prior to transmitting each frame of the message.

7. The method according to claim 6, wherein determining transmission power comprises modifying the transmission power from a previous transmission power established by the another power control scheme.

8. The method according to claim 6, wherein determining the transmission power comprises governing the transmission power based on the number of frames in the message.

9. The method according to claim 6 further comprising enabling the another power control scheme after transmitting each frame of the message.

10. The method according to claim 1, wherein determining the transmission power comprises selecting a transmission power to ensure a pre-defined probability of delivery of the message.

11. The method according to claim 1, wherein the transmission power is less than a predetermined ceiling value.

12. The method according to claim 1, wherein the transmission power increases with the increase in the number of frames in the message.

13. A communication entity comprising:
    a processor for calculating a number of frames in a message to be transmitted, wherein the number of frames is calculated based in part on a length of the message;
    a first power controller coupled to the processor, for determining a first transmission power to transmit the message based on the number of frames;
    an amplifier operatively coupled to the first power controller, for adjusting transmission power based on the first transmission power; and
    a transmitter operatively coupled to the first power controller, the transmitter for transmitting each frame of the message using the transmission power.

14. The communication entity according to claim 13 further comprising a memory coupled to the processor for storing a look-up table, wherein the look-up table comprises a mapping from the number of frames in the message to a first list of values for transmission power gain.

15. The communication entity according to claim 14, wherein the look-up table further comprises a mapping from the number of frames in the message to a second list of values for transmission power gain.

16. The communication entity according to claim 15, wherein values for the transmission power gain in the second list are greater than corresponding values for the transmission power gain in the first list.

17. The communication entity according to claim 13 further comprising a memory coupled to the processor for storing a link-simulation curve mapping transmission power to the number of frames in the message.

18. The communication entity according to claim 13 further comprising a memory coupled to the processor for storing one or more of: a value of a pre-defined probability of delivering the message, a link-simulation curve, and a look-up table.

19. The communication entity according to claim 13 further comprising a second power controller coupled to the processor, for determining a second transmission power based on a second power control scheme.

20. The communication entity according to claim 19 further comprising a switch coupled to the processor, the first power controller, and the second power controller, wherein the switch is controlled by the process to select from one of the first power controller and the second power controller.

21. The communication entity according to claim 13 wherein the first power controller is also for determining a second transmission power based on a second power control scheme.

* * * * *